United States Patent
Liu et al.

(10) Patent No.: US 8,204,440 B2
(45) Date of Patent: Jun. 19, 2012

(54) WIRELESS TRANSMITTING/RECEIVING DEVICE

(75) Inventors: Fu-Hsiang Liu, Taipei (TW); Zhih-Pei Shih, Taipei (TW); Yung-Lang Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 661 days.

(21) Appl. No.: 12/366,647

(22) Filed: Feb. 6, 2009

(65) Prior Publication Data
US 2009/0247081 A1   Oct. 1, 2009

(30) Foreign Application Priority Data
Mar. 28, 2008 (TW) .............................. 97111532 A

(51) Int. Cl.
*H04B 7/00* (2006.01)
(52) U.S. Cl. ........................ 455/41.2; 455/41.3
(58) Field of Classification Search ............ 455/41.2
See application file for complete search history.

(56) References Cited

U.S. PATENT DOCUMENTS

| | | | | |
|---|---|---|---|---|
| 5,930,340 A | * | 7/1999 | Bell | 379/93.08 |
| 5,978,689 A | * | 11/1999 | Tuoriniemi et al. | 455/569.1 |
| 6,112,103 A | * | 8/2000 | Puthuff | 455/557 |
| 6,138,036 A | * | 10/2000 | O'Cinneide | 455/557 |
| 6,868,117 B1 | | 3/2005 | Mardinian | |
| 7,245,502 B2 | | 7/2007 | Kochis et al. | |
| 2008/0058011 A1 | | 3/2008 | Lin et al. | |

OTHER PUBLICATIONS

"Office Action of Taiwan Counterpart Application", issued on Aug. 15, 2011, p. 1-p. 5, in which the listed reference was cited.

* cited by examiner

*Primary Examiner* — Hai L Nguyen
(74) *Attorney, Agent, or Firm* — Jianq Chyun IP Office

(57) ABSTRACT

A wireless transmitting/receiving device includes a wireless emitter, a connector, a digital signal processor, an audio signal connector and an analog signal processor. The wireless transmitting/receiving device is used to be electrically connected to an electronic device and transmit data by sending and receiving wireless signals. The connector is used to be electrically connected to the electronic device. The digital signal processor is electrically connected to the wireless emitter, and the digital signal processor may be connected to the connector. The audio signal connector is used to be electrically connected to the electronic device. The analog signal processor is electrically connected to the wireless emitter, and the analog signal processor may be connected to the audio signal connector.

8 Claims, 2 Drawing Sheets

WIRELESS TRANSMITTING/RECEIVING DEVICE

CROSS-REFERENCE TO RELATED APPLICATION

This application claims the priority benefit of Taiwan application serial no. 97111532, filed on Mar. 28, 2008. The entirety of the above-mentioned patent application is hereby incorporated by reference herein and made a part of specification.

BACKGROUND OF THE INVENTION

1. Field of the Invention

The invention relates to a transmitting/receiving device and, more particularly, to a wireless transmitting/receiving device.

2. Description of the Related Art

With the progress of the wireless transmission equipment and technology, data tends to be transferred and received between different electronic devices wirelessly instead of wiredly.

To take a computer as an example, a user may transmit data wirelessly through a wireless network distributor outside the computer via a wireless transmitting/receiving device connected to a connecting port of the computer. However, the wireless transmitting/receiving devices seen in the market do not have audio signal connectors. Therefore, sound signals provided by mobile phones, MP3 players and other electronic devices cannot be input to the wireless transmitting/receiving devices and sent to other electronic devices wirelessly.

BRIEF SUMMARY OF THE INVENTION

The invention provides a wireless transmitting/receiving device to which signals of an electronic device may be input via a connector or an audio signal connector.

The wireless transmitting/receiving device in the invention is used to be electrically connected to an electronic device to transfer data via sending and receiving wireless signals. The wireless transmitting/receiving device includes a wireless emitter, a connector, a digital signal processor, an audio signal connector and an analog signal processor. The connector is used to be electrically connected to the electronic device. The digital signal processor is electrically connected to the wireless emitter, and the digital signal processor may be connected to the connector. The audio signal connector is used to be electrically connected to the electronic device. The analog signal processor is electrically connected to the wireless emitter, and the analog signal processor may be connected to the audio signal connector.

In an embodiment, the wireless transmitting/receiving device further includes a switch. The digital signal processor is electrically connected to the connector via the switch. The analog signal processor is electrically connected to the audio signal connector via the switch. The switch only allows the digital signal processor to be electrically connected to the connector or the analog signal processor to be electrically connected to the audio signal connector. In addition, when the electronic device is electrically connected to the connector, the switch only allows the digital signal processor to be electrically connected to the connector. In addition, when the electronic device is electrically connected to the audio signal connector, the switch only allows the analog signal processor to be electrically connected to the audio signal connector.

In an embodiment, the wireless transmitting/receiving device further includes a case. The wireless emitter, the connector, the digital signal processor, the audio signal connector and the analog signal processor are disposed at the case, and the connector and part of the audio signal connector are exposed out of the case.

In an embodiment of the wireless transmitting/receiving device, the wireless emitter is a Bluetooth wireless emitter.

In an embodiment of the wireless transmitting/receiving device, the audio signal connector is a jack whose hole diameter is 2.5 millimeters or 3.5 millimeters.

In an embodiment, the wireless transmitting/receiving device further includes a wireless receiver electrically connected to the digital signal processor and the analog signal processor.

In an embodiment of the wireless transmitting/receiving device, the connector is a universal serial bus connector.

To sum up, the wireless transmitting/receiving device in the invention may wirelessly transmit signals for an electronic device having a corresponding port or an electronic device having a sound signal output port.

These and other features, aspects and advantages of the present invention will become better understood with regard to the following description, appended claims, and accompanying drawings.

DETAILED DESCRIPTION OF THE EMBODIMENTS

Figure 1:
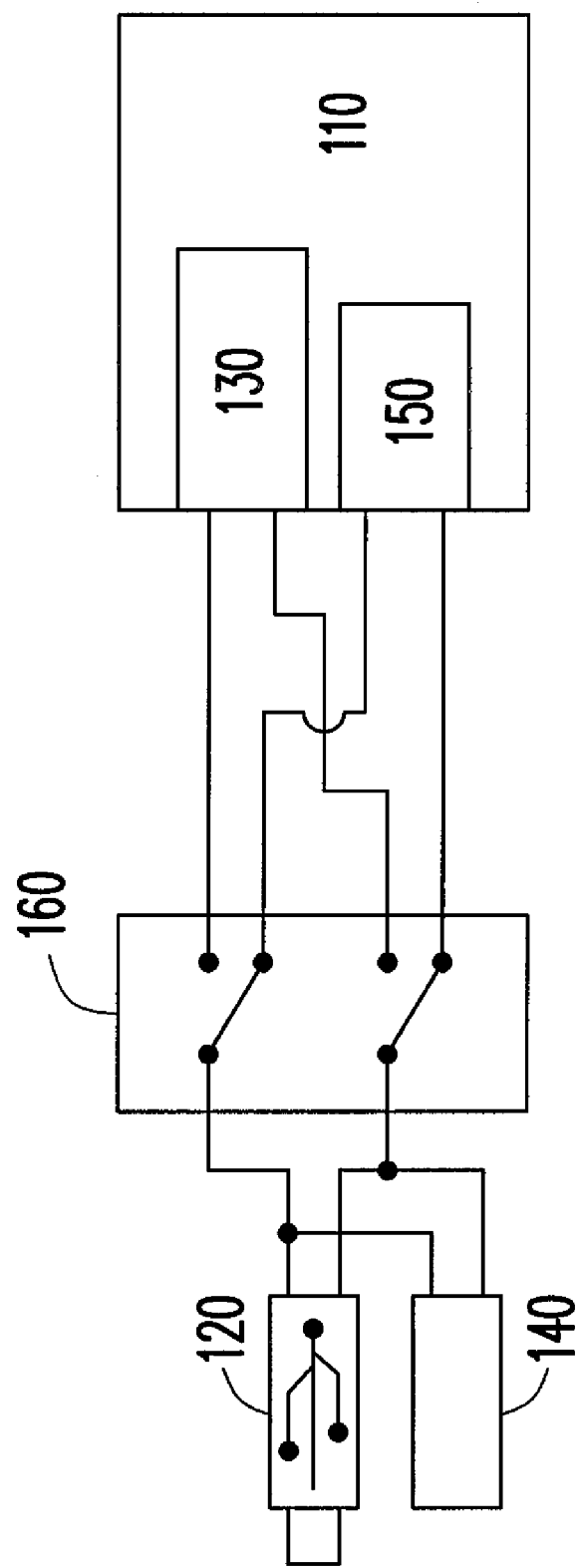
FIG. 1 is a schematic diagram showing the wireless transmitting/receiving device in an embodiment of the invention.

FIG. 1 is a schematic diagram showing a wireless transmitting/receiving device in an embodiment of the invention. As shown in FIG. 1, the wireless transmitting/receiving device 100 in the embodiment includes a wireless emitter 110, a connector 120, a digital signal processor 130, an audio signal connector 140 and an analog signal processor 150. The digital signal processor 130 is electrically connected to the wireless emitter 110, and the digital signal processor 130 also may be connected to the connector 120. Thus, an electronic device which has a interface corresponding to the connector 120 such as a computer may be connected to the connector 120. Then, digital signals are input to the digital signal processor 130 to be processed via the connector 120. After processed, digital signal is transmitted to the electronic device which may receive signals wirelessly by the wireless emitter 110. The analog signal processor 150 is electrically connected to the wireless emitter 110, and the analog signal processor 150 also may be connected to the audio signal connector 140. Thus, an electronic device which has a sound output port such as a MP3 player may be connected to the audio signal connector 140. Then, the digital signal is input to the analog signal processor 150 to be processed via the audio signal connector 140. After processed, the digital signal is transmitted to the electronic device which may receive wireless signals wirelessly by the wireless emitter 110. In this embodiment, the connector 120 can be a universal serial bus connector.

In other words, the wireless transmitting/receiving device 100 in the embodiment may be connected to the electronic device which has a interface corresponding to the connector 120 by the user, and signals may be transmitted between the electronic device and other electronic devices wirelessly. In addition, the user also may connect an electronic device having a sound signal output port to the same wireless transmitting/receiving device 100, and the signals may be transmitted wirelessly between the electronic device and other electronic devices.

A user may connect the wireless transmitting/receiving device 100 to a computer via the connector 120 to transfer data in the computer to a mobile phone having a wireless transmission function wirelessly. In addition, the user may connect the wireless transmitting/receiving device 100 to a MP3 player via the audio signal connector 140 to transmit the sound signals outputted by the MP3 player to an earphone having a wireless transmission function wirelessly. Thus, the user may listen to music with wireless earphones.

In addition, the wireless transmitting/receiving device 100 in the embodiment also may selectively include a switch 160. The digital signal processor 130 is electrically connected to the connector 120 via the switch 160. The analog signal processor 150 is also electrically connected to the audio signal connector 140 via the switch 160. When the connector 120 is electrically connected to the electronic device which has a interface corresponding to the connector 120, the switch 160 may only allow the digital signal processor 130 to be electrically connected to the connector 120. When the audio signal connector 140 is electrically connected to the electronic device which has a sound signal output port, the switch 160 may only allow the analog signal processor 150 to be electrically connected to the audio signal connector 140. For example, the switch 160 determines what state should be switched to according to if the connector 120 is detected to have five volts operation voltage. Thus, the wireless transmitting/receiving device 100 in the embodiment may transmit input signals to the digital signal processor 130 or the analog signal processor 150 according to the connection state of the connector 120 and the audio signal connector 140 automatically. However, the digital signal processor 130 also may be electrically connected to the connector 120 constantly, and the analog signal processor 150 also may be electrically connected to the audio signal connector 140 constantly. The source of the signal transmitted to the wireless emitter 110 is determined by the connection state of the connector 120 and the audio signal connector 140.

In addition, the wireless emitter 110 may be a Bluetooth wireless emitter or one of other wireless emitters. In addition, the wireless transmitting/receiving device 100 further includes a wireless receiver (not shown) which is electrically connected to the digital signal processor 130 and the analog signal processor 150. The wireless receiver may be integrated with or separated from the wireless emitter 110. For example, the user may send data in a mobile phone having a wireless transmission function to the wireless transmitting/receiving device 100 wirelessly, and then the received data is transmitted to the connected computer via the connector 120. In addition, the user also may transmit sound signal output by a MP3 player having a wireless transmission function to the wireless transmitting/receiving device 100, and then the received signal is transmitted to a connected earphone to allow the user to listen to music via the audio signal connector 140. The audio signal connector 140 in the embodiment is a jack whose hole diameter is 2.5 millimeters or 3.5 millimeters.

Figure 2:
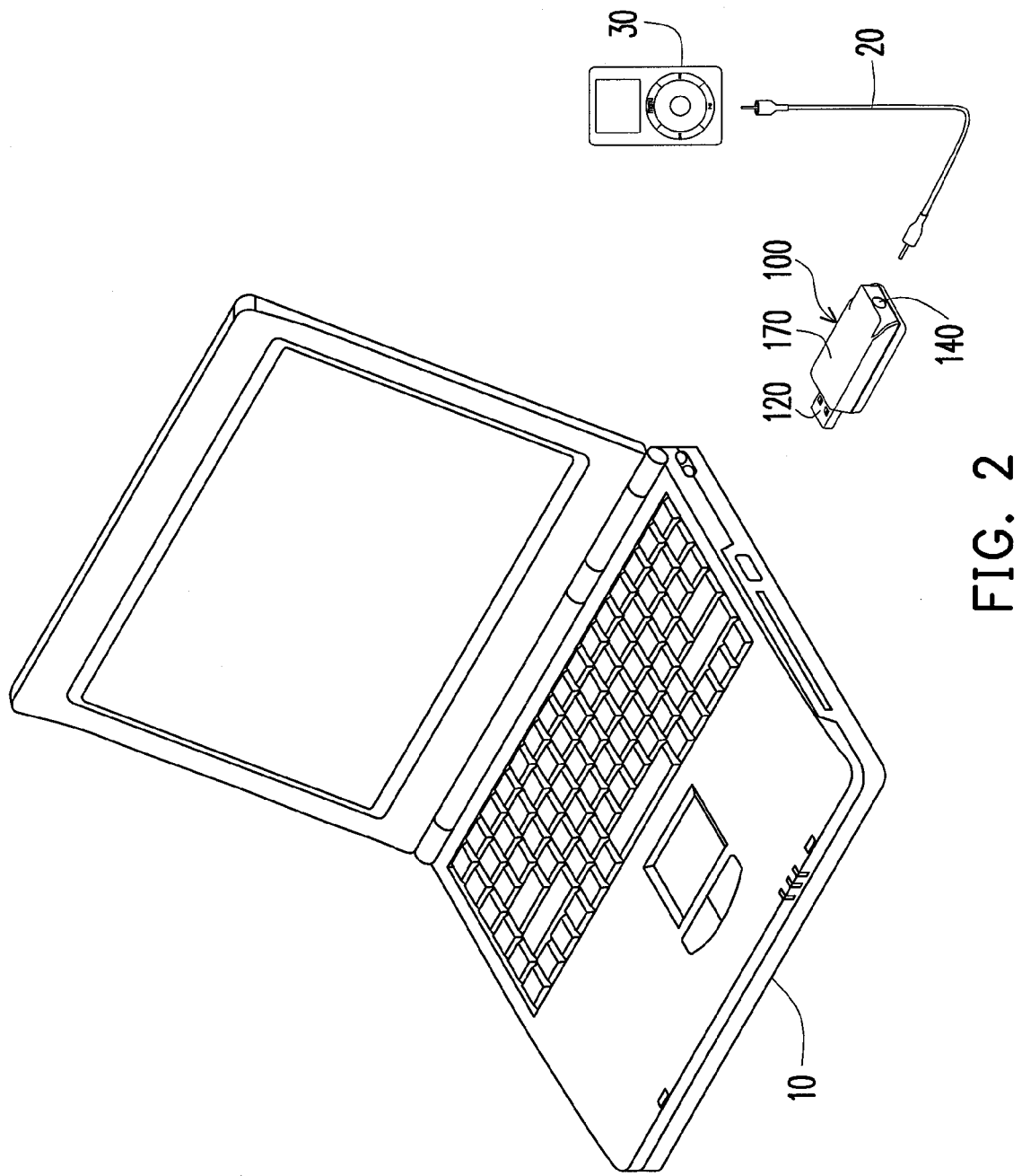
FIG. 2 is a schematic diagram showing the appearance of the wireless transmitting/receiving device shown in FIG. 1.

FIG. 2 is a schematic diagram showing the appearance of the wireless transmitting/receiving device in FIG. 1. As shown in FIG. 1 and FIG. 2, the wireless transmitting/receiving device 100 in the embodiment further includes a case 170. The wireless emitter 110, the connector 120, the digital signal processor 130, the audio signal connector 140, the analog signal processor 150 and the switch 160 are disposed at the case 170. In addition, the connector 120 and part of the audio signal connector 140 are exposed out of the case 170 to assist in connecting other electronic devices. For example, the wireless transmitting/receiving device 100 may be connected to a notebook computer 10 having a interface (not shown) corresponding to the connector 120 via the connector 120, and it also may be connected to a MP3 player 30 having a sound signal connecting port (not shown) via a audio signal connector 140 and a sound signal wire 20. However, the wireless transmitting/receiving device 100 in the embodiment also may be modularized and assembled to a proper electronic device, and a case therein is not necessary.

To sum up, since the wireless transmitting/receiving device in the invention has the connector and the audio signal connector, it not only can send and receive signals wirelessly for an electronic device which has a corresponding interface, but also can send and receive signals for an electronic device which has a sound signal output port. This increases the application scope of the wireless transmitting/receiving device and the value of the product greatly.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A wireless transmitting/receiving device for being electrically connected to an electronic device and transferring data by sending and receiving wireless signals, the wireless transmitting/receiving device comprising:
    a wireless emitter;
    a connector for being electrically connected to the electronic device;
    a switch;
    a digital signal processor electrically connected to the wireless emitter, wherein the digital signal processor is capable of being connected to the connector via the switch;
    an audio signal connector for electrically connected to the electronic device;
    an analog signal processor electrically connected to the wireless emitter, wherein the analog signal processor is capable of being connected to the audio signal connector via the switch; and
    wherein, the switch only allows the digital signal processor to be electrically connected to the connector or allows the analog signal processor to be electrically connected to the audio signal connector.

2. The wireless transmitting/receiving device according to claim 1, wherein the connector is a universal serial bus connector.

3. The wireless transmitting/receiving device according to claim 1, wherein when the electronic device is electrically connected to the connector, the switch only allows the digital signal processor to be electrically connected to the connector.

4. The wireless transmitting/receiving device according to claim 1, wherein when the electronic device is electrically connected to the audio signal connector, the switch only allows the analog signal processor to be electrically connected to the audio signal connector.

5. The wireless transmitting/receiving device according to claim 1, further comprising a case, wherein the wireless emitter, the connector, the digital signal processor, the audio signal connector and the analog signal processor are disposed at the case, and the connector and part of the audio signal connector are exposed out of the case.

6. The wireless transmitting/receiving device according to claim 1, wherein the wireless emitter is a Bluetooth wireless emitter.

7. The wireless transmitting/receiving device according to claim 1, wherein the audio signal connector is a jack whose hole diameter is 2.5 millimeters or 3.5 millimeters.

8. The wireless transmitting/receiving device according to claim 1, further comprising a wireless receiver electrically connected to the digital signal processor and the analog signal processor.

* * * * *